United States Patent
Hara

(10) Patent No.: US 9,875,435 B2
(45) Date of Patent: Jan. 23, 2018

(54) DRAWING DATA GENERATION APPARATUS

(71) Applicant: FUJI XEROX CO., LTD., Tokyo (JP)

(72) Inventor: Yuki Hara, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/220,038

(22) Filed: Jul. 26, 2016

(65) Prior Publication Data

US 2017/0262741 A1  Sep. 14, 2017

(30) Foreign Application Priority Data

Mar. 10, 2016  (JP) .................. 2016-046537

(51) Int. Cl.
*G06F 3/12* (2006.01)
*G06K 15/02* (2006.01)

(52) U.S. Cl.
CPC ..... *G06K 15/1825* (2013.01); *G06K 15/1802* (2013.01); *G06K 15/1836* (2013.01); *G06K 15/1842* (2013.01)

(58) Field of Classification Search
None
See application file for complete search history.

(56) References Cited

U.S. PATENT DOCUMENTS

| | | | | |
|---|---|---|---|---|
| 6,052,200 A * | 4/2000 | Mitani | ............... | G06K 15/1896 358/1.16 |
| 7,746,494 B2 * | 6/2010 | Kidani | .................. | G06F 3/1211 358/1.1 |
| 8,823,997 B2 * | 9/2014 | Hayakawa | ......... | G06K 15/1822 358/1.15 |
| 8,873,076 B2 * | 10/2014 | Sato | ................... | G06K 15/1807 358/1.1 |
| 2009/0296142 A1 * | 12/2009 | Tomihisa | ............... | G06K 15/02 358/1.15 |
| 2010/0177342 A1 * | 7/2010 | Takeishi | ................. | G06K 15/02 358/1.15 |

(Continued)

FOREIGN PATENT DOCUMENTS

| | | | |
|---|---|---|---|
| JP | 2005-301457 A | 10/2005 |
| JP | 2006-157444 A | 6/2006 |
| JP | 2009-296590 A | 12/2009 |

*Primary Examiner* — Dung Tran
(74) *Attorney, Agent, or Firm* — Oliff PLC

(57) ABSTRACT

A drawing data generation apparatus includes a first intermediate data generation section that generates first intermediate data from formation image data in which a formation image is indicated as a cluster of drawing components, a second intermediate data generation section that generates, from the first intermediate data, second intermediate data indicating drawing content of each line-shaped region of the formation image, and a drawing data generation section that generates, from the second intermediate data, drawing data indicating drawing content of each line-shaped region in a row of pixel data. The second intermediate data generation section selects, based on the first intermediate data, either a first scheme of arranging an overlap of the drawing components and generating the second intermediate data from the cluster of drawing components or a second scheme of expressing and integrating the drawing components as a cluster of the pixels and generating the second intermediate data.

3 Claims, 16 Drawing Sheets

(56) References Cited

U.S. PATENT DOCUMENTS

| | | | |
|---|---|---|---|
| 2012/0050763 A1* | 3/2012 | Takeishi | H04N 1/642 358/1.9 |
| 2012/0086970 A1* | 4/2012 | Takahashi | G06K 15/1859 358/1.13 |
| 2013/0250353 A1* | 9/2013 | Hara | G06K 15/1857 358/1.15 |
| 2014/0078526 A1* | 3/2014 | Suzuki | G06K 15/1825 358/1.9 |
| 2014/0185098 A1* | 7/2014 | Araya | H04N 1/00347 358/1.16 |
| 2016/0034793 A1* | 2/2016 | Okamura | G06K 15/1851 358/1.18 |
| 2016/0078643 A1* | 3/2016 | Oishi | G06T 11/00 358/1.15 |

* cited by examiner

FIG. 9

| LINE | SCHEME | WORK UPPER LIMIT SIZE | WORK SIZE | NUMBER-OF-Edges THRESHOLD | NUMBER of Edges | WORK BUFFER (Edge INFORMATION) |
|---|---|---|---|---|---|---|
| 1 | Edge SCHEME | 1024 | 0 | 10 | 0 | NO |
| 2 | Edge SCHEME | 1024 | 48 | 10 | 2 | Edge[0]: KIND: MONOCHROMATIC, START POINT: 20, END POINT: 40, COLOR: 255<br>Edge[1]: KIND: RASTER, START POINT: 70, END POINT 100, RASTER DATA |
| 3 | Raster SCHEME | 1024 | 1024 | 10 | 0 | RASTER DATA, TAG DATA |
| 4 | Raster SCHEME | 1024 | 1024 | 10 | 0 | RASTER DATA, TAG DATA |
| 5 | Edge SCHEME | 1024 | 36 | 10 | 1 | Edge[0]: KIND: MONOCHROMATIC, START POINT: 20, END POINT: 40, COLOR: 255 |
| 6 | Edge SCHEME | 1024 | 0 | 10 | 0 | NO |

100, 101, 102, 103, 104, 105, 106

DRAWING DATA GENERATION APPARATUS

CROSS-REFERENCE TO RELATED APPLICATIONS

This application is based on and claims priority under 35 U.S.C. 119 from Japanese Patent Application No. 2016-046537 filed on Mar. 10, 2016.

TECHNICAL FIELD

The present invention relates to a drawing data generation apparatus that generates drawing data indicating drawing content of a print image.

SUMMARY

According to an aspect of the present invention, a drawing data generation apparatus includes a first intermediate data generation section that generates, from formation image data in which a formation image formed on a recording material is indicated as a cluster of the drawing components allowed to mutually overlap, first intermediate data in which the formation image is indicated by a cluster of component data indicating a color and a range of a drawing component section, a second intermediate data generation section that generates, from the first intermediate data, second intermediate data indicating drawing content of each line-shaped region in a row of drawing commands which are drawn with no mutual overlap in the plurality of line-shaped regions divided in a line shape from the formation image and indicate colors and lengths. and a drawing data generation section that generates, from the second intermediate data, drawing data indicating drawing content of each line-shaped region in a row of pixel data indicating drawing colors in a plurality of pixels divided in a dot shape from the line-shaped region. The second intermediate data generation section selects one of a first scheme of converting the formation image data into a cluster of the drawing components with no mutual overlap by arranging the overlap of the plurality of drawing components and generating the second intermediate data from the cluster of the drawing components and a second scheme of expressing and integrating the plurality of drawing components as a cluster of the pixels and generating the second intermediate data from the cluster of the pixels, based on the current first intermediate data or data which is generated in association with a process on the first intermediate data and depends on the first intermediate data.

BRIEF DESCRIPTION OF THE DRAWINGS

Exemplary embodiments of the present invention will be described in detail based on the following figures, wherein:

FIG. 9 is a diagram illustrating a management table;

DETAILED DESCRIPTION

Hereafter, an exemplary embodiment of the invention will be described below with reference to the accompanying drawings.

Figure 1:
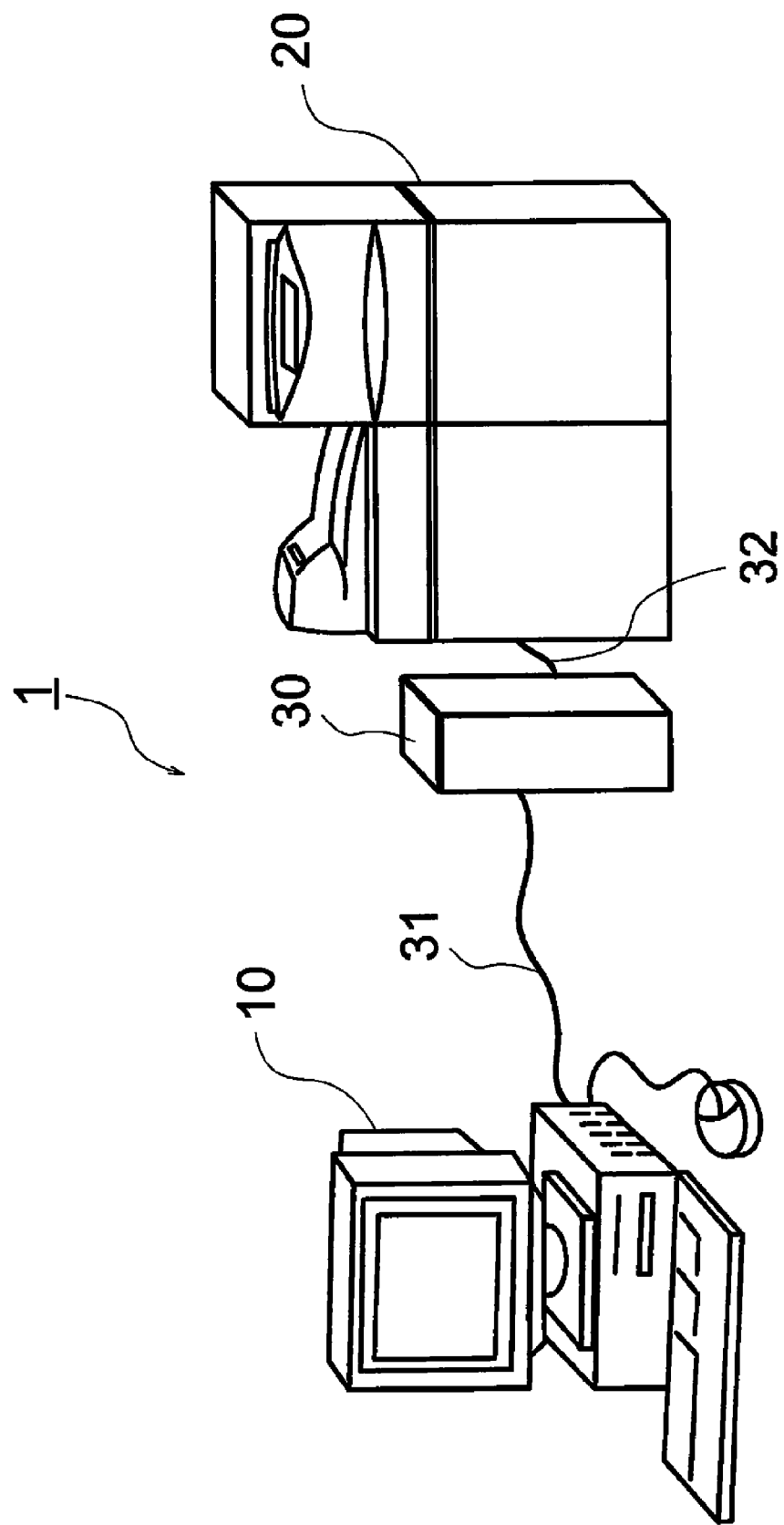
FIG. 1 is a diagram illustrating a print system in which an exemplary embodiment of a drawing data generation apparatus according to the invention is incorporated.

FIG. 1 is a diagram illustrating a print system in which the exemplary embodiment of a drawing data generation apparatus according to the invention is incorporated.

A print system 1 includes a personal computer 10, a printer 20, and a server 30. The personal computer 10 and the server 30 are interconnected by a cable 31 such as a LAN, and the server 30 and the printer 20 are interconnected by a dedicated cable 32.

The personal computer 10 edits an image of an output product output by the printer 20 and transmits page data indicating the edited image to the server 30 via the cable 31. The page data is data with the POSTSCRIPT (registered trademark) format (hereinafter, this format is referred to as a "PS format") or the PDF format of Adobe Systems Incorporated and indicates an image as a cluster of several drawing components (for instance, objects).

The printer 20 is, for instance, a large-sized printer corresponding to on-demand printing or the like. The printer 20 forms an image on a sheet according to drawing data (for instance, raster data or run-length compressed data) indicating drawing content by which the image is drawn on the sheet and outputs the image as a print product. The drawing data is data indicating an image as a cluster of pixels and is formed of pixel data of each pixel indicating the color of each pixel.

The server 30 illustrated in FIG. 1 is assumed to generate raster data which is a kind of drawing data from the page data with the PS format or the PDF format and transmit the raster data to the printer 20. The server 30 corresponds to an exemplary embodiment of the drawing data generation apparatus according to the invention.

Figure 2:
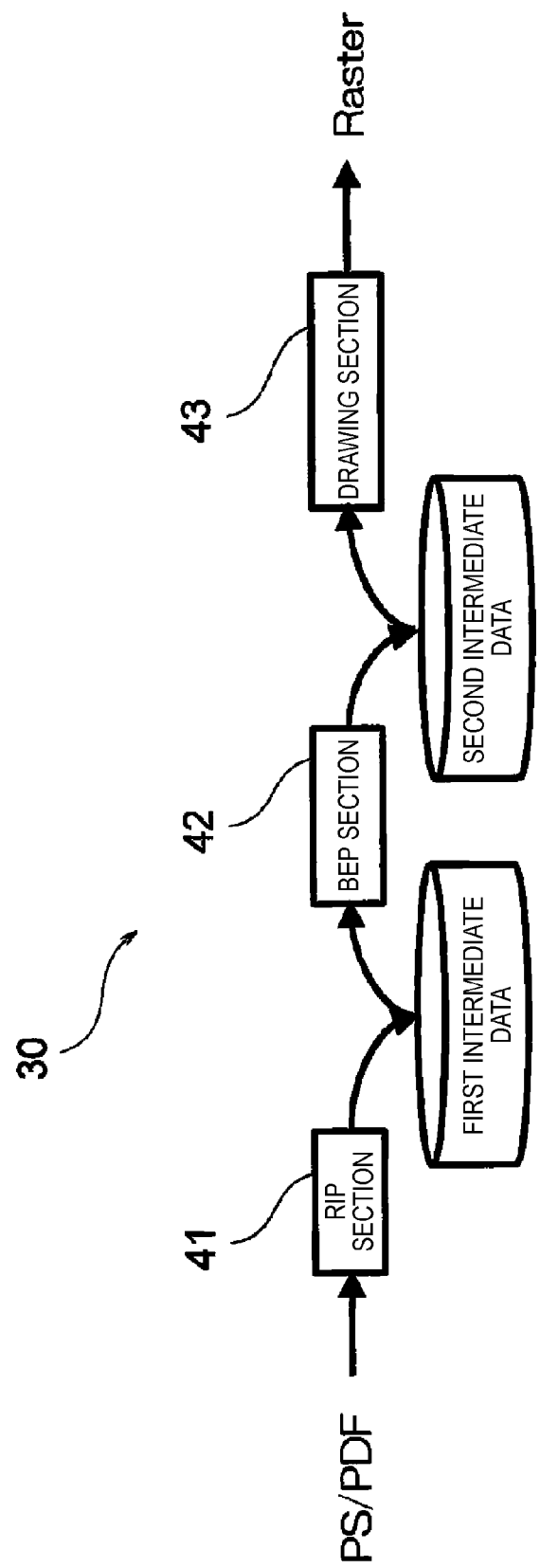
FIG. 2 is a diagram illustrating a functional configuration of a server.

FIG. 2 is a diagram illustrating a functional configuration of the server 30.

The server 30 illustrated in FIG. 1 includes a RIP section 41, a BEP section 42, and a drawing section 43.

The RIP section 41 converts the page data with the PS format or the PDF format into first intermediate data.

The BEP section 42 converts the first intermediate data into second intermediate data.

The drawing section 43 converts the second intermediate data into drawing data.

The RIP section 41 corresponds to an instance of a first intermediate data generation section according to the invention, the BEP section 42 corresponds to an instance of a second intermediate data generation section according to the invention, and the drawing section 43 corresponds to an instance of a drawing data generation section according to the invention.

Hereinafter, the details of the first intermediate data and the second intermediate data will be described.

Figure 3:
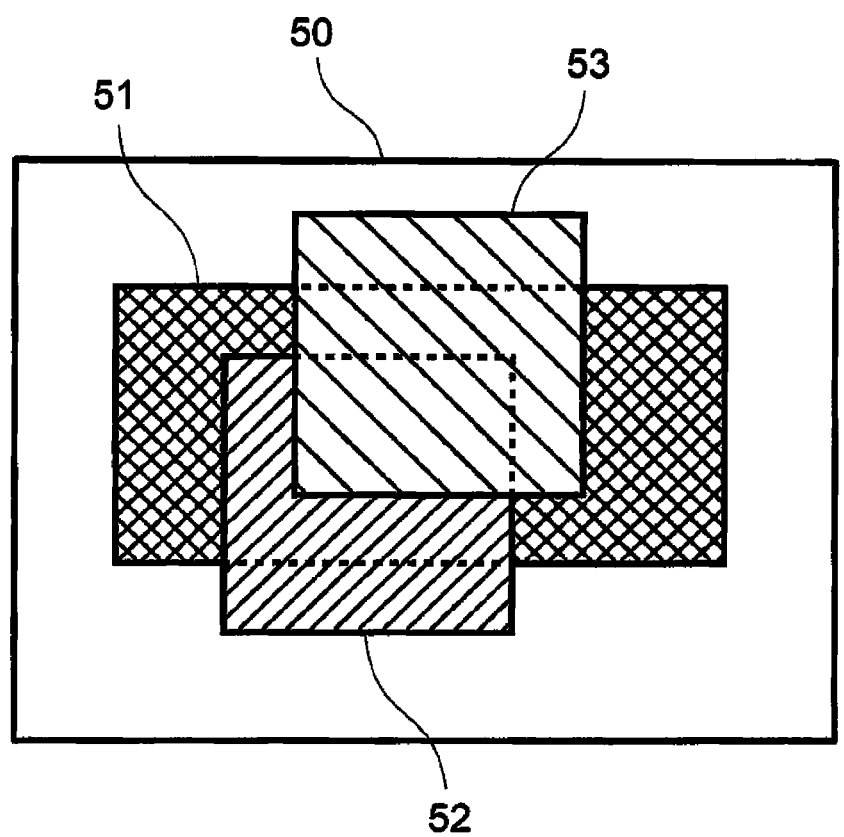
FIG. 3 is a diagram illustrating a concept of first intermediate data.

FIG. 3 is a diagram illustrating a concept of the first intermediate data.

The first intermediate data is data with a unified format which does not depend on whether the page data has the PS format or the PDF format, but takes over information regarding the drawing components of the page data. A color and a range of drawing and information regarding an overlap order are included as the information regarding the drawing components. In the exemplary embodiment, such information is assumed to be maintained with a so-called object which is a kind of drawing object that maintains the information. That is, the drawing object corresponds to an instance of the drawing component according to the invention and the object corresponds to an instance of the drawing object.

The first intermediate data is data indicating an image 50 as a cluster of objects 51, 52, and 53. The objects 51, 52, and 53 correspond to objects included in the page data edited by the personal computer 10 illustrated in FIG. 1. In the instance illustrated herein, the image 50 is formed with the three objects 51, 52, and 53. The objects 51, 52, and 53 are allowed to mutually overlap. In the instance illustrated herein, the second object 52 overlap on the first object 51 and the third object 53 further overlaps on the first object 51 and the second object 52.

The objects 51, 52, and 53 in the first intermediate data have data of a drawing color and data of a drawing range. There are monochromatic objects and rater-color objects by a difference in the data format of the drawing color. In the monochromatic object, one piece of color data is given in the entire drawing range. Conversely, in the rater-color objet, pieces of color data of pixels are given setting the drawing range as a cluster of the plural pixels. Here, the resolution of the pixels in the object is a resolution (hereinafter, the resolution is referred to as an "input resolution") set at the time of editing in the personal computer 10 illustrated in FIG. 1 and is generally lower than the resolution (hereinafter, the resolution is referred to as an "output resolution") of the printer 20.

As described above, the objects 51, 52, and 53 in the first intermediate data have the drawing colors and the drawing ranges, and the objects 51, 52, and 53 correspond to instances of drawing components according to the invention. The drawing ranges of the objects 51, 52, and 53 are 2-dimensional ranges.

Figure 4:
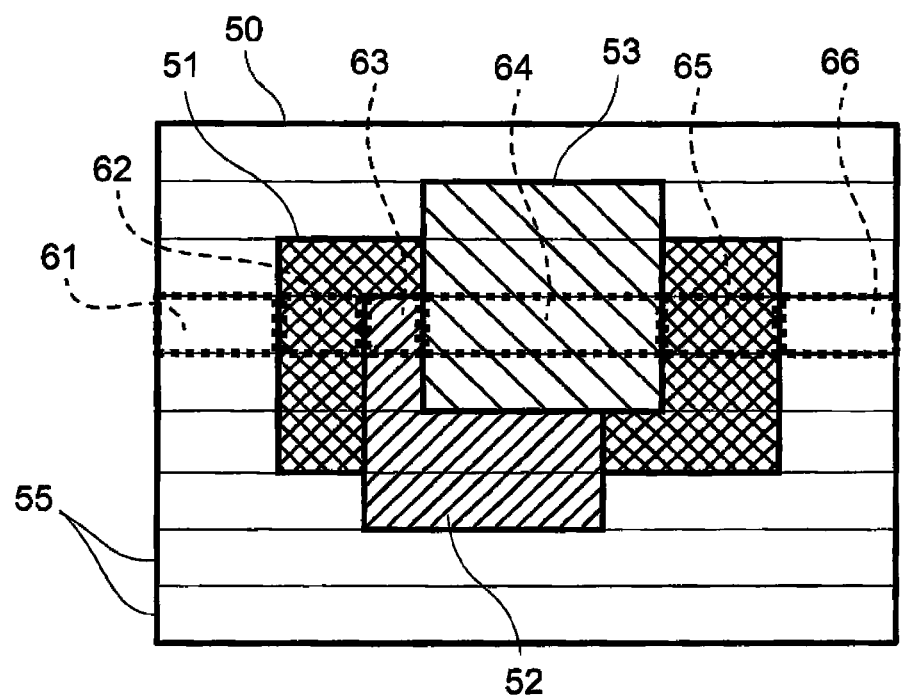
FIG. 4 is a diagram illustrating a concept of second intermediate data.

FIG. 4 is a diagram illustrating a concept of the second intermediate data.

The second intermediate data is data in which the image 50 is divided into output lines 55 according to the output resolution in the printer 20 and the drawing content of each output line 55 is expressed with rows of commands 61, 62, 63, 64, 65, and 66. The output line 55 corresponds to an instance of a line-shaped region according to the invention.

Since the commands 61 to 66 have drawing colors and drawing lengths and have no information regarding an overlap, an overlap between the commands are not permitted. In the instance illustrated herein, the commands have no information regarding drawing start points. Therefore, the command is necessarily drawn immediately after the drawing of the previous command and a command is also necessary in a white portion. However, in an instance in which the command has information regarding a start point, a command is unnecessary in a white portion.

In the case of the six commands 61 to 66 illustrated in FIG. 4, the commands include the object 61 indicating a white portion, the commands 62 and 65 corresponding to the first object 51, the command 63 corresponding to the second object 52, the command 64 corresponding to the third object 53, and the command 66 indicating the final of the drawing.

The commands will be described in more detail. There are four kinds of commands, "FILL", "ECOPY", "DTCOPY", and "END".

The "FILL" command is a command indicating monochromatic drawing and has one piece of color data indicating a drawing color and number-of-pixels data indicating a drawing length.

The "ECOPY" command is a command indicating a drawing color as a row of the pixels with the above-described input resolution and has plural pieces of color data (pixel data) indicating drawing colors, number-of-pixels data indicating a drawing length, and a magnification at which an input resolution is converted into an output resolution.

The "DTCOPY" command is a command indicating a drawing color as a row of pixels of the output resolution and has plural pieces of color data (pixel data) indicating a drawing color and number-of-pixels data indicating a drawing length.

The "END" command is a command indicating drawing end.

The BEP section 42 illustrated in FIG. 2 uses two schemes to be described below when generating the second intermediate data formed by the four kinds of commands from the first intermediate data illustrated in FIG. 3. Of two conversion schemes of converting the first intermediate data into second intermediate data, a first scheme is also referred to as an edge scheme and a second scheme is also referred to as a rater scheme. The conversion schemes will be described below.

In the first scheme, the second intermediate data is generated from the first intermediate data through processes "edging", "flattening", and "commanding".

Figure 5:
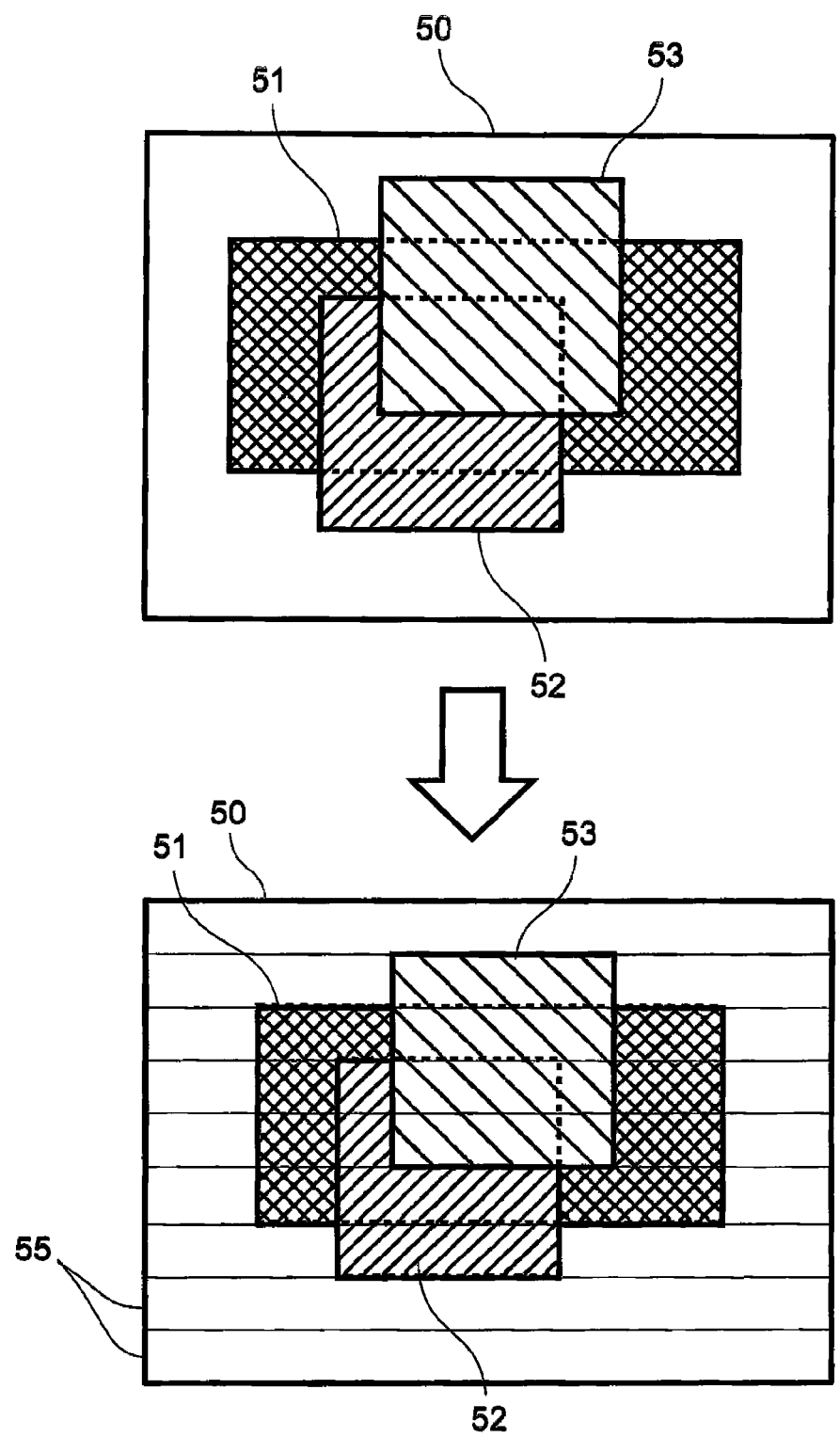
FIG. 5 is a diagram illustrating a concept of edging in a first scheme.

FIG. 5 is a diagram illustrating a concept of edging in the first scheme.

In the edging of the first scheme, the image 50 expressed as a cluster of the objects 51, 52, and 53 is divided into output lines 55 according to the output resolution in the printer 20. That is, in the edging, the objects 51, 52, and 53 are divided into the output lines 55 to generate edge information. Each piece of edge information has a drawing color and a drawing length and a mutual overlap is permitted. Accordingly, an order of appearance on the image is assigned to each piece of edge information as information indicating the mutual overlap. The earlier appearing edge information is located further below in the overlap.

Figure 6:
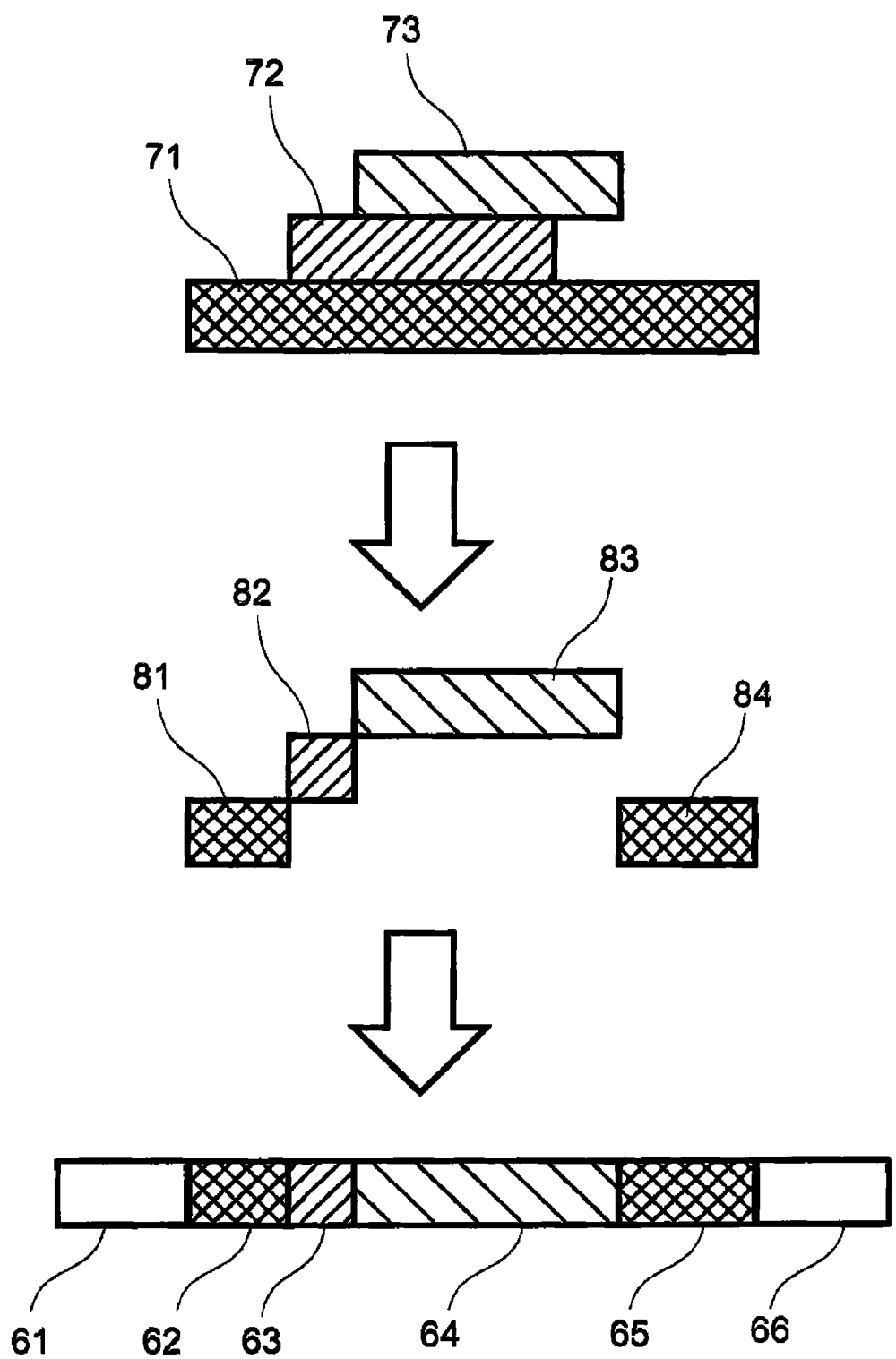
FIG. 6 is a diagram illustrating a concept of flattening and commanding in the first scheme.

FIG. 6 is a diagram illustrating a concept of flattening and commanding in the first scheme.

FIG. 6 illustrates a structural concept of data corresponding to one output line. In the instance illustrated herein, three pieces of edge information 71, 72, and 73 corresponding to the three objects 51, 52, and 53 illustrated in FIG. 5 are illustrated. As described above, in the pieces of edge information 71, 72, and 73, a mutual overlap is permitted. The vertical direction of FIG. 6 indicates the above and the below of the pieces of edge information 71, 72, and 73 in the mutual overlap.

The pieces of edge information 71, 72, and 73 obtained through the edging of the objects also have drawing colors and drawing ranges (lengths), the pieces of edge information 71, 72, and 73 correspond to drawing components according to the invention. The drawing ranges of the pieces of edge information 71, 72, and 73 are 1-dimensional ranges. As the drawing colors of the pieces of edge information 71, 72, and 73, there are two kinds of a monochromatic color and a raster color.

In flattening, the mutual overlap of the pieces of edge information 71, 72, and 73 is confirmed and portions hidden on the lower side of the other edge information are deleted, and thus pieces of edge information 81, 82, 83, and 84 with no mutual overlap are generated. Of the four pieces of edge information 81, 82, 83, and 84, two pieces of edge information 81 and 84 at both ends are generated by being divided from one piece of edge information 71 before the flattening.

After the pieces of edge information 81, 82, 83, and 84 with no mutual overlap are generated in this way through the flattening, the commands 61 to 66 corresponding to the pieces of edge information 81, 82, 83, and 84 and white portions are generated through the commanding. Specifically, the monochromatic-color edge information and the white portions are converted into FILL commands and the raster-color edge information is converted into the ECOPY commands.

As described above, in the first scheme, the second intermediate data is generated through the "edging", the "flattening", and the "commanding". In contrast, in the second scheme, the second intermediate data is generated through processes of "rasterizing" and "commanding".

Figure 7:
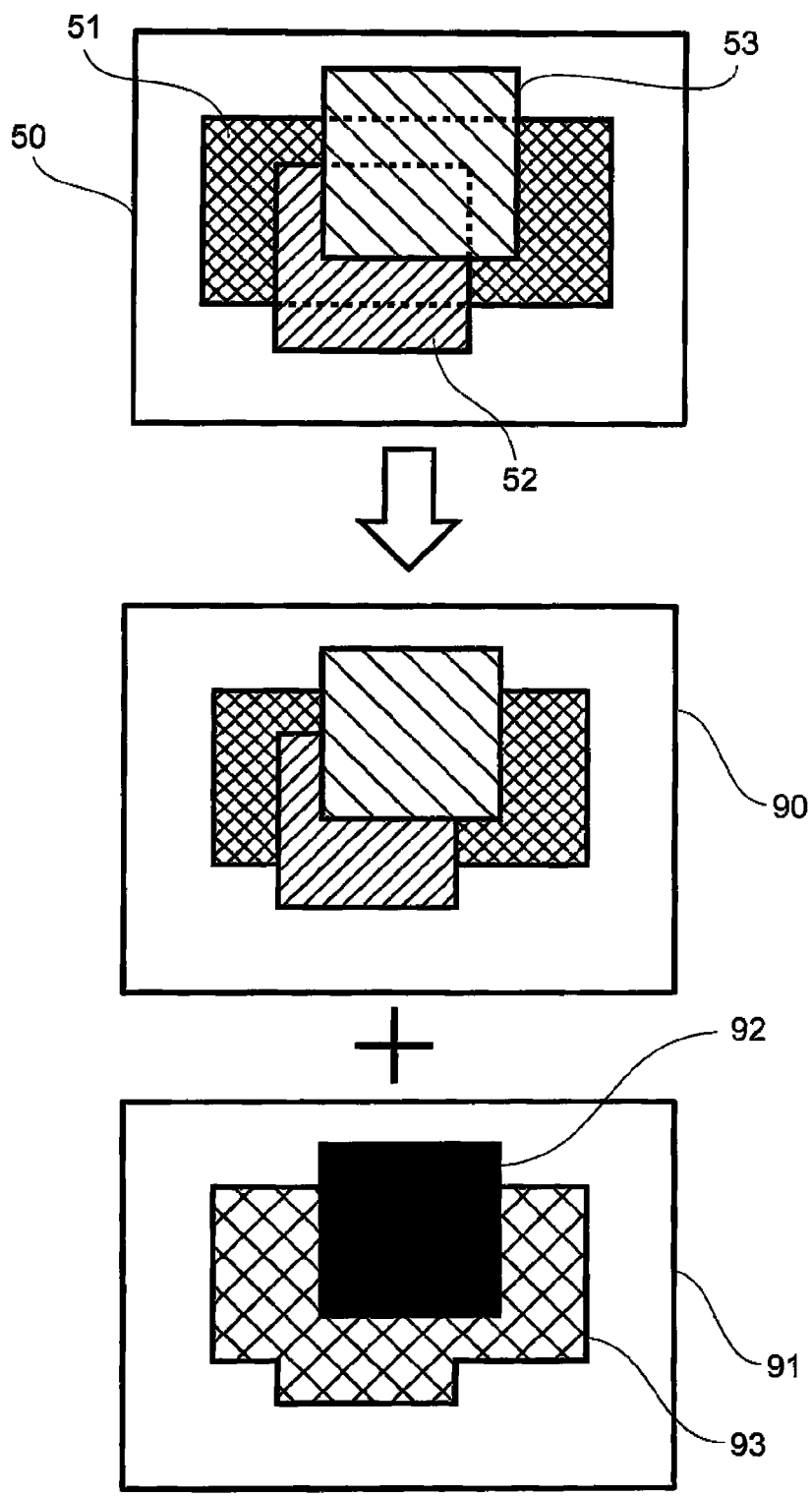
FIG. 7 is a diagram illustrating a concept of rasterizing in a second scheme.

FIG. 7 is a diagram illustrating a concept of rasterizing in the second scheme.

In the rasterizing of the second scheme, the entire image 50 expressed as the cluster of the objects 51, 52, and 53 is integrated to be expressed as a cluster of pixels. Specifically, the objects 51, 52, and 53 are first converted into pixel clusters, the pixel clusters of the objects 51, 52, and 53 are overwritten on disposition spots of the objects 51, 52, and 53 sequentially in the appearance order of the objects 51, 52, and 53. As a result, an integrated image (CMYK edition) 90 in which there is no distinction between the drawing components can be obtained. In the image 90, there is no distinction between the objects and there is no distinction between the drawing spots and the white portions. The entire image 90 is occupied by pixels with the output resolution and each of the pixels has color data, including the white portions.

Such an integrated image 90 is generated and a TAG edition 91 is concurrently generated to distinguish the monochromatic-color range from the raster-color range. That is, the objects 51, 52, and 53 are overwritten on the image 90 and tag values indicating whether the pixels have the monochromatic color or the raster color are concurrently overwritten sequentially on the TAG edition 91. As a result, in the TAG edition 91, a monochromatic-color range 93 indicating that the tag value is the monochromatic color and the raster-color range 92 indicating that the tag value is the rater color are formed. In the instance illustrated herein, since the first object 51 and the second object 52 have the monochromatic color and the third object 53 has the raster color among the three objects 51, 52, and 53 of the image 50 before the rasterizing, the raster-color range 92 on the TAG edition 91 corresponds to a range of the third object 53 and the monochromatic-color range 93 on the TAG edition 91 corresponds to a range of a combination of the first object 51 and the second object 52 excluding the third object 53. A range which is neither the monochromatic-color range 93 nor the raster-color range 92 on the TAG edition 91 is a white portion.

The commanding is performed according to the image 90 and the TAG edition 91 obtained through the rasterizing.

Figure 8:
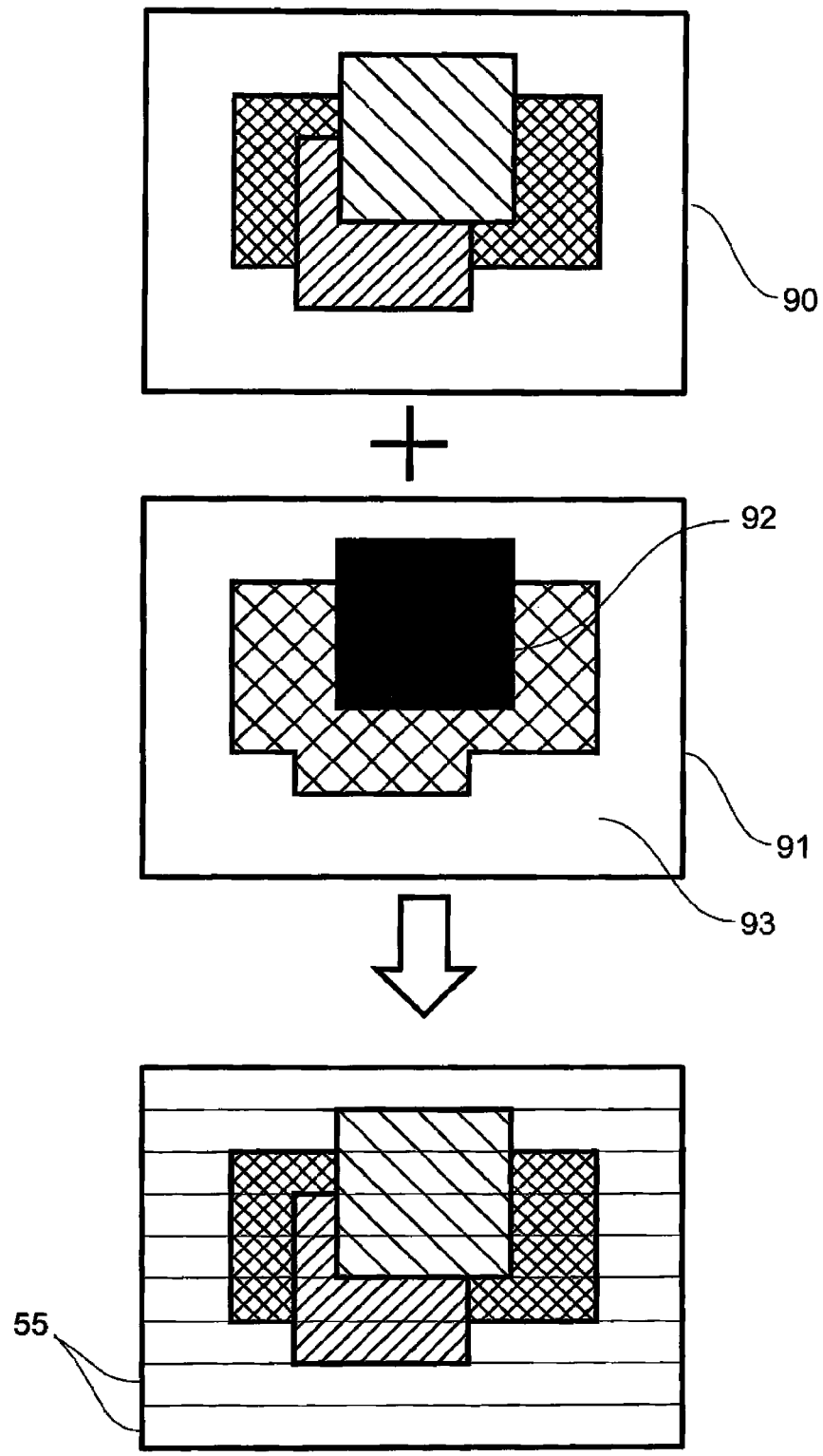
FIG. 8 is a diagram illustrating a concept of commanding in the second scheme.

FIG. 8 is a diagram illustrating a concept of the commanding in the second scheme.

In the commanding of the second scheme, the image 90 expressed as the cluster of the pixels is divided into the output lines 55. Of the pixels in the row of each output line 55, the pixels located in the monochromatic-color range 93 or the white portion on the TAG edition 91 are converted into one FILL command for each piece of same color data. On the other hand, of the pixels in the row of the output line 55, the pixels located in the raster-color range 92 on the TAG edition 91 are converted into one DTCOPY command for each row of the pixels.

The BEP section 42 illustrated in FIG. 2 appropriately selects the above-described first and second schemes and generates the second intermediate data. The first and second schemes are conversion schemes known in the related art, but it has been not known that depending on processing target data, there is an advantage or a disadvantage in generation of the second intermediate data by the first and second schemes. Here, the "advantage in the generation of the second intermediate data" means that a processing time necessary for the generation is short or a data amount necessary for the generation is small. The inventors of the present specification have examined the types of data by which there is advantage or a disadvantage in detail for the first time.

The inventors of the present specification have thoroughly examined and have found that, for the first scheme (that is, an edge scheme), when the number of processing target objects or the number of pieces of edge information is large, the number of calculations performed to confirm a mutual overlap of edge information becomes vast particularly upon flattening, and thus a processing performance deteriorates. On the other hand, the inventors have found that, for the second scheme (that is, a raster scheme), the DTCOPY command is frequently used through the rasterizing, and therefore when data has a large raster-color range, the data size of the second intermediate data increases and there is a concern that a memory capacity or the like used for the drawing section 43 illustrated in FIG. 2 is pressurized.

Accordingly, in the exemplary embodiment, as will be described below, a scheme advantageous to generate the second intermediate data is selected and used between the first and second schemes depending on processing target data. Here, the "advantageous" means to be advantageous to calculation resources and corresponds to, for instance, the fact that a short calculation time or a small data capacity necessary for calculation is "advantageous".

In the exemplary embodiment, the first or second scheme is selected, for instance, in units of output lines. Therefore, in the exemplary embodiment, a management table is used to manage a conversion scheme for each output line.

FIG. 9 is a diagram illustrating the management table.

A management table 100 illustrated in FIG. 9 has information regarding 6 output lines, for instance. One row of the management table 100 corresponds to one output line.

The management table 100 has a scheme field 101, a work size field 102, and a number-of-edges field 103. A conversion scheme, a work size, and the number of edges are recorded for each output line. In the instance illustrated in FIG. 9, a work upper limit size field 104 and a number-of-edges threshold 105 are provided and a work upper limit size and a number-of-edges threshold are recorded for each output line. However, in the work upper limit size and the number-of-edges threshold, necessity for setting different values for each output line is low. In the management table 100, one work upper limit size and one number-of-edges threshold may be set, and the work upper limit size and the number-of-edges threshold may be commonly used for all the output lines. The work size in the output line of the raster scheme is assumed to normally have the same value as the work upper limit size.

The management table 100 has a work buffer 106 corresponding to each row (that is, corresponding to each output line). In the work buffer 106, the above-described edge information is recorded in the output line of the edge scheme, and the raster data and the TAG data are recorded in the output line of the raster scheme.

An order in which the second intermediate data is generated while selecting a generation scheme in each output line using the management table 100 will be described below with reference to a flowchart.

Figure 10:
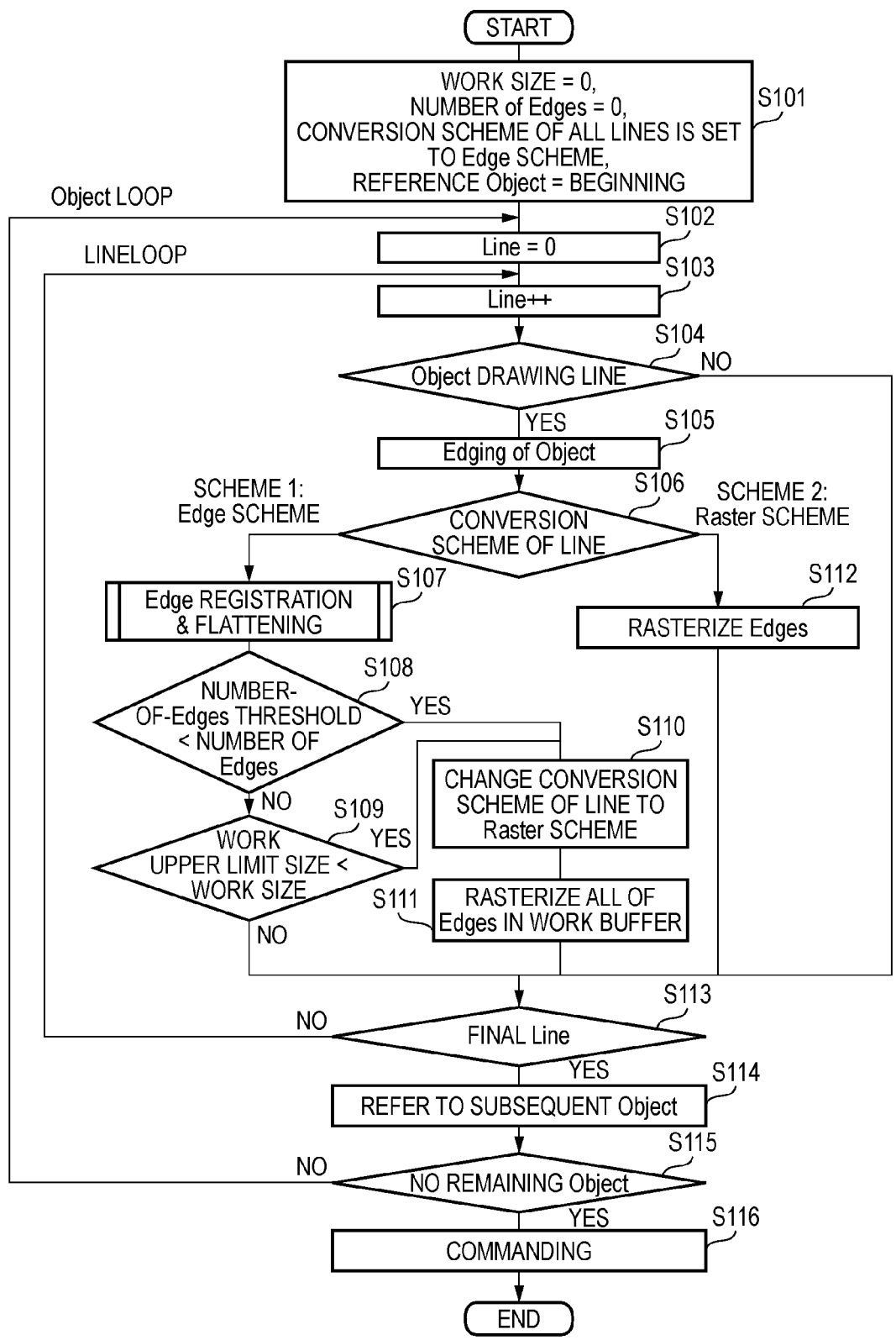
FIG. 10 is a flowchart illustrating an overall procedure in which the second intermediate data is generated.

FIG. 10 is a flowchart illustrating an overall procedure in which the second intermediate data is generated.

When the procedure illustrated in the flowchart of FIG. 10 starts, initial setting is first performed in step S101. In the initial setting, records of the work buffer 106 in all of the rows (that is, all of the output lines) of the management table 100 are erased and a value "0" is substituted to the work size field 102 and the number-of-edges field 103. In the initial setting, the "edge scheme" is set in all of the rows of the management table 100 in the scheme field 101. A beginning object (that is, the bottom stage of the overlap) among the objects included in the first intermediate data is set as a reference object.

Thereafter, the processing procedure enters an object loop and a numerical value indicating a processing target output line is reset to "0" (step S102).

Further, the processing procedure enters a line loop and one numerical value indicating the processing target output line is added (step S103). Immediately after the processing procedure enters the line loop, the numerical value indicating the output line becomes a value "1" indicating the beginning output line of the image through the addition of step S103.

Thereafter, it is determined whether a current output line is an output line within the drawing range of a current reference object (step S104). When the current output line is deviated from the drawing range (N in step S104), the process proceeds to the final step S113 of the line loop and it is confirmed whether the current output line is the final output line. When the current output line is not the final output line (N in step S113), the process returns to step S103.

When it is determined in step S104 that the current output line is the output line within the drawing range of the current reference object (Y in step S104), the edging is performed on the current reference object to generate the edge information corresponding to the current output line portion (step S105). Thereafter, the conversion scheme in the current output line is confirmed with reference to the scheme field 101 of the management table 100 (step S106).

When the conversion scheme is the raster scheme (step S106: scheme 2), the edge information generated in step S105 is rasterized (step S112) and the process proceeds to the final step S113 of the line loop.

Conversely, when the conversion scheme is the edge scheme (step S106: scheme 1), "edge registration and flattening process" to be described below in detail is performed on the edge information generated in step S105 (step S107).

Thereafter, for the current output line, it is determined whether the number of edges exceeds the number-of-edges threshold, with reference to the number-of-edges field 103 and the number-of-edges threshold 105 of the management table 100 (step S108). When the number of edges is equal to or less than the number-of-edges threshold (N in step S108), it is determined whether the work size exceeds the work upper limit size, with reference to the work size field 102 and the work upper limit size 104 of the management table 100 (step S109).

When the work size is equal to or less than the work upper limit size (N in step S109), the process proceeds to the final step S113 of the line loop.

Conversely, when the number of edges exceeds the number-of-edges threshold (Y in step S108) and the work size exceeds the work upper size (Y in step S109), it is regarded to be disadvantageous to generate the second intermediate data by the edge scheme, and thus the raster scheme is set as the conversion scheme of the current output line with reference to the scheme field 101 of the management table 100 (step S110). Then, all of the pieces of edge information recorded on the work buffer 106 of the management table 100 are rasterized (step S112) and the process proceeds to the final step S113 of the line loop.

When it is confirmed in step S113 that the output line is the final output line (Y in step S113), the process exits from the line loop and the reference object is changed to a subsequent object (an object immediately above in the overlap order). When there is the "subsequent object" (N in step S115), the process returns to the first step S102 of the object loop and the above-described procedure is repeated.

Conversely, when there is no "subsequent object" (that is, the current reference object is on the top stage of the overlap) as the reference object (Y in step S115), the process exits from the object loop, the second intermediate data is generated through a commanding process to be described below (step S116), and the process illustrated in FIG. 10 ends.

Incidentally, in the instance of the process illustrated in the flowchart of FIG. 10, the "raster scheme" is appropriately selected as the conversion scheme by setting the conversion scheme as the "edge scheme" once for all the output lines in the initial setting of step S101 and subsequently performing the determinations of step S108 and step S109. Accordingly, the edge scheme is preferentially used to generate the second intermediate data. As the edge scheme is used, the data amount of the second intermediate data decreases.

In the instance of the process illustrated in the flowchart of FIG. 10, the conversion scheme is selected for each output line. Therefore, the conversion scheme is more frequently changed than when the conversion scheme is selected, for instance, in units of blocks, units of pages, or units of jobs greater than the output lines, and thus an advantageous scheme is selected more reliably.

In the instance of the process illustrated in the flowchart of FIG. 10, after the number of edges is determined in step S108, the work size is determined in step S109. Therefore, when the number of edges is large, the raster scheme is selected irrespective of the work size, and thus a processing time is prevented from being vast due to the excessive number of edges.

In the instance of the process illustrated in the flowchart of FIG. 10, the work size is determined in step S109 and the conversion scheme is selected so that the work size reliably falls within the upper limit. Therefore, a lack of the work memory is prevented.

Here, concepts of the line loop and the object loop will be described.

Figure 11:
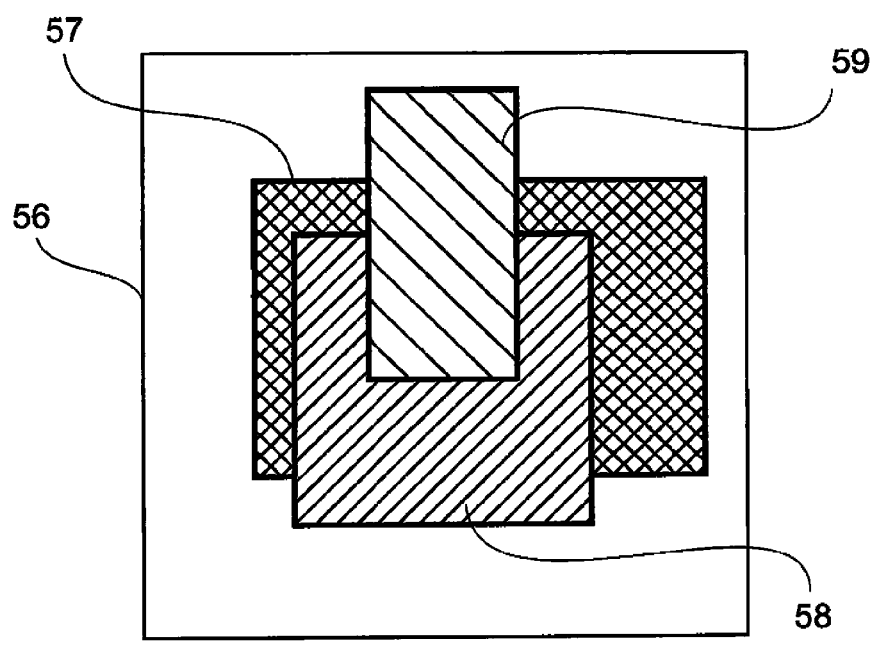
FIG. 11 is a diagram illustrating an instance of an image used to describe a concept of line loop and object loop.
Figure 12:
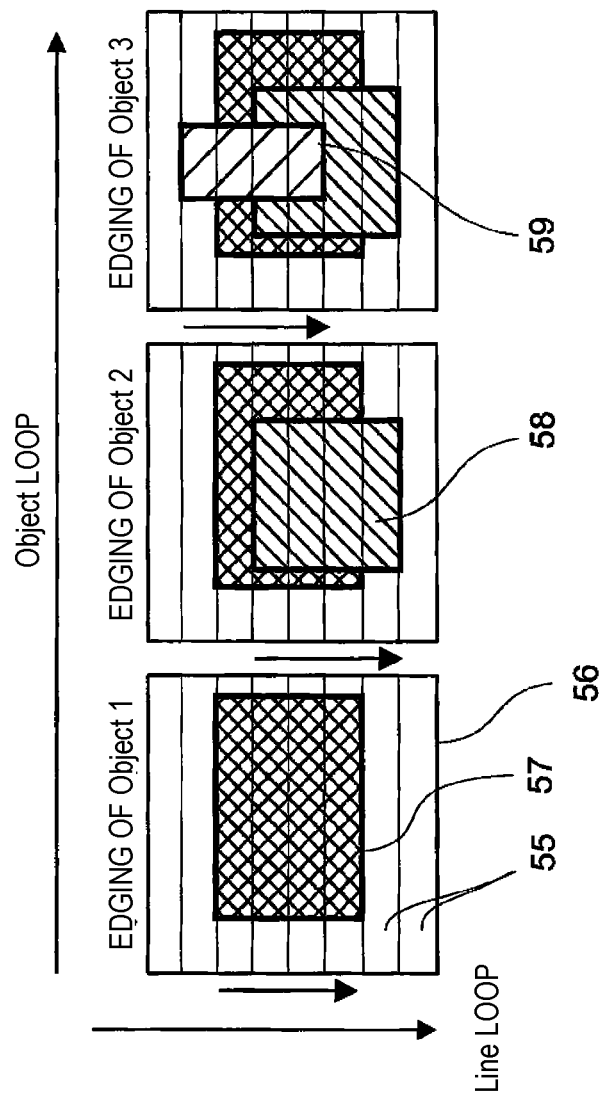
FIG. 12 is a diagram illustrating the concept of the line loop and the object loop.

FIG. 11 is a diagram illustrating an instance of an image used to describe a concept of line loop and object loop. FIG. 12 is a diagram illustrating the concept of the line loop and the object loop.

FIG. 11 illustrates an instance of an image 56 having three objects 57, 58, and 59. The first object 57 is located on the bottom stage of an overlap. The second object 58 overlaps on the first object 57 and the third object 59 overlaps on both of the first object 57 and the second object 58.

As indicated by an arrow in the lateral direction in FIG. 12, the objects 57, 58, and 59 are disposed in order from the lower side of the overlap in the range of the image 56 divided into the output lines 55 in the object loop. As indicated by an arrow in the vertical direction in FIG. 12, the objects 57, 58, and 59 are edged one line by one line in the line loop. At this time, an edging range is a range of the output lines on which the objects 57, 58, and 59 are mounted.

Next, the "edge registration and flattening process" performed in step S107 of FIG. 10 will be described.

Figure 13:
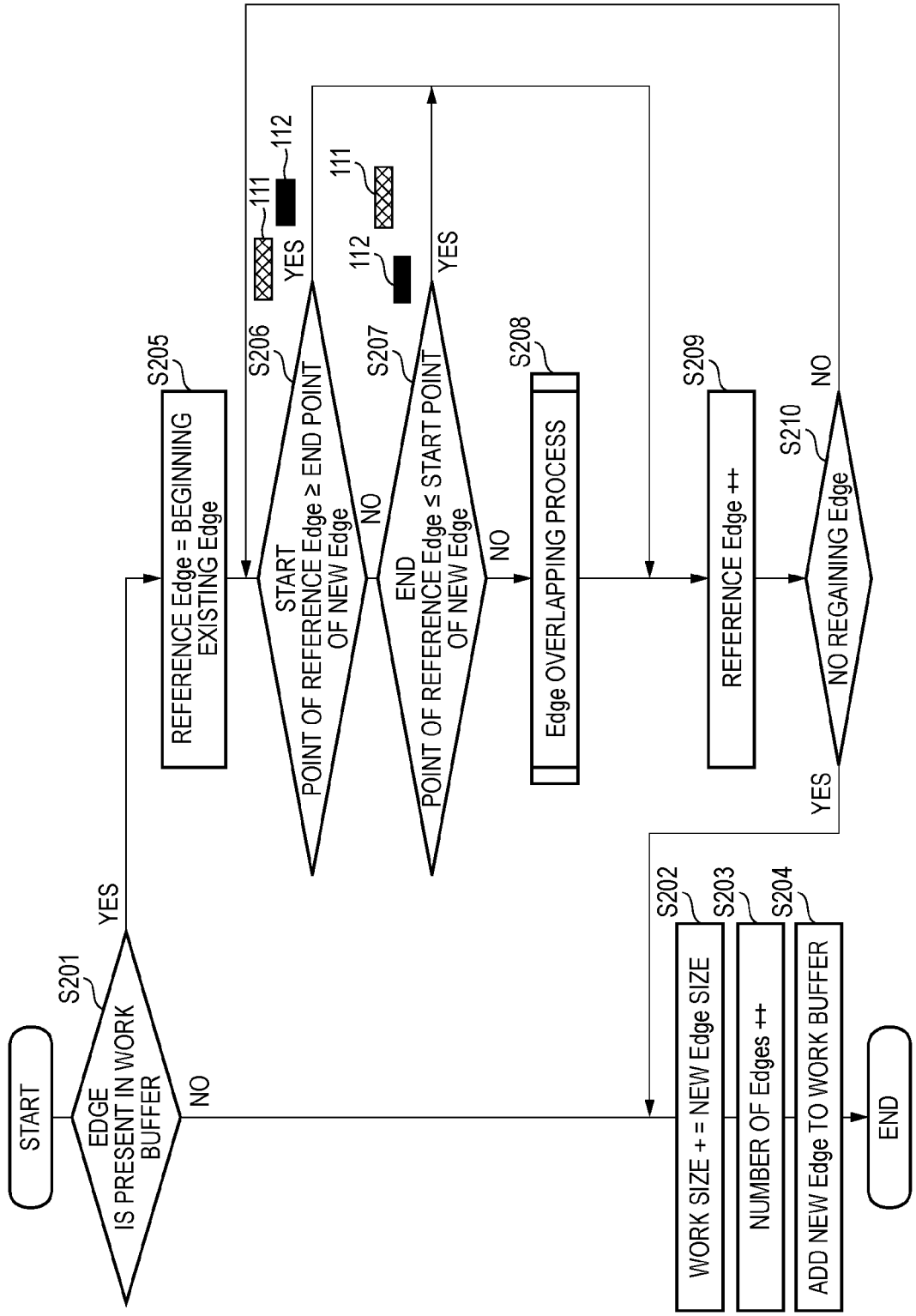
FIG. 13 is a flowchart illustrating "edge registration and flattening process"

FIG. 13 is a flowchart illustrating "edge registration and flattening process".

As described above, the "edge registration and flattening process" is a process performed on the currently generated edge information (hereinafter, the edge information is referred to as "new edge information" in some cases) when the conversion scheme in the processing target output line is the edge scheme. When this process starts, it is confirmed whether there is the edge information already registered in the work buffer 106 of the row of the management table 100 corresponding to the processing target output line (hereinafter, the edge information is referred to as "existing edge information in some cases) (step S201). When there is no existing edge information (N in step S201), the new edge information is first edge information in the current processing target output line. Therefore, a value recorded in the work size field 102 of the management table 100 is increased by a data size of the new edge information (step S202), a value recorded in the number-of-edges field 103 is increased by 1 (step S203), the new edge information is additionally registered in the work buffer 106 (step S204), and the "edge registration and flattening" process ends.

Conversely, when it is confirmed in step S201 that there is the existing edge information (Y in step S201), the flattening is necessary between the existing edge information and the current edge information. Accordingly, the process proceeds to step S205, the first registered edge information among the pieces of existing edge information is set as reference edge information, the start point of the reference edge information is compared to the end point of the new edge information (step S206), and the end point of the reference edge information is compared to the start of the new edge information (step S207). When the start point of the reference edge information is subsequent to the end point of the new edge information (Y in step S206) and the end point of the reference edge information is previous to the start point of the new edge information (Y in step S207), the new edge information 111 and the reference edge information 112 have no overlap, as illustrated in the inserted drawing of the flowchart. Therefore, the process proceeds to step S209 and subsequent existing edge information is set as the reference edge information. Conversely, when there is the "subsequent existing edge information" in the work buffer 106 of the management table 100 (N in step S210), the process returns to steps S206 and S207 described above.

When the start point of the reference edge information is previous to the end point of the new edge information in step S206 (N in step S206) and the end point of the reference edge information is subsequent to the start point of the new edge information in step S207 (N step S207), the new edge information and the reference edge information have an overlap. Therefore, in step S208, an "edge overlapping process" to be described below is performed. Thereafter, the process proceeds to step S209 and subsequent existing edge information is set as the reference edge information. When the "subsequent existing edge information" is not present in the work buffer 106 of the management table 100 (Y in step S210), the comparison between the new edge information and all of the pieces of edge existing information ends. Therefore, the value recorded in the work size 102 of the management table 100 is increased by a data size of the new edge information (step S202), the value recorded in the number-of-edges field 103 is increased by 1 (step S203), the new edge information is additionally registered in the work buffer 106 (step S204), and the "edge registration and flattening" process ends. Since the anteroposterior relation between the new edge information and the existing edge information is known by comparing the start point to the end point, the new edge information is assumed to be registered at a position at which the same order as the anteroposterior order of the processing target output lines is set at the time of registration of step S204.

Next, the "edge overlapping process" performed in the above-described step S208 will be described.

Figure 14:
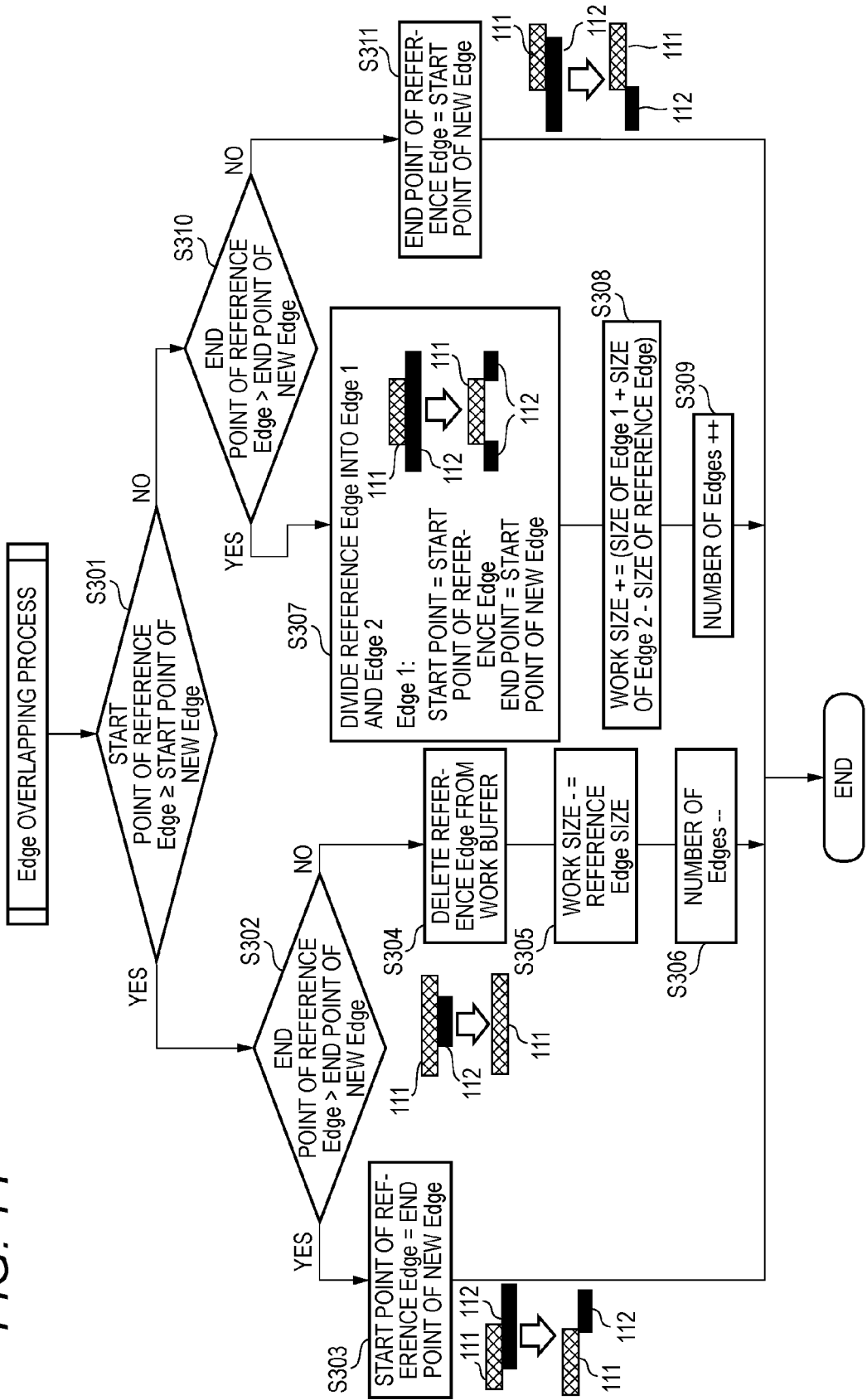
FIG. 14 is a flowchart illustrating an "edge overlapping process"

FIG. 14 is a flowchart illustrating the "edge overlapping process".

When the "edge overlapping process" is performed, the start point of the reference edge information is first compared to the start point of the new edge information (step S301) and the end point of the reference edge information is compared to the end point of the new edge information (steps S302 and S310).

When the start point of the reference edge information is subsequent to the start point of the new edge information (Y in step S301) and the end point of the reference edge information is also subsequent to the end point of the new edge information (Y in step S302) as the results of the comparison, the new edge information 111 partially overlaps with the front side of the reference edge information 112. Accordingly, the process proceeds to step S303 and the value of the start point of the reference edge information recorded on the work buffer 106 of the management table 100 is overwritten to the value of the end point of the new edge information. Thus, since a part of the front side of the reference edge information 112 with which the new edge information 111 overlaps is deleted and the overlap of the new edge information 111 and the reference edge information 112 is cancelled, the "edge overlapping process" ends.

When the start point of the reference edge information is subsequent to the start point of the new edge information (Y in step S301) and the end point of the reference edge information is previous to the end point of the new edge information (N in step S302) as the results of the comparison of the foregoing steps S301, S302, and S310, the new edge information 111 entirely overlaps with the reference edge information 112. Accordingly, the process proceeds to step S304 to delete the reference edge information from the work buffer 106 of the management table 100. Thereafter, the value recorded in the work size field 102 is decreased by the data size of the reference edge information (step S305) and the value recorded in the number-of-edge field 103 is decreased by 1 (step S306). Thus, since the overlap of the new edge information 111 and the reference edge information 112 is cancelled, the "edge overlapping process" ends.

When the start point of the reference edge information is previous to the start point of the new edge information (N in step S301) and the end point of the reference edge information is subsequent to the end point of the new edge information (Y in step S310) as the results of the comparison of the foregoing steps S301, S302, and S310, the new edge information 111 overlaps with the halfway portion of the reference edge information 112, and thus the reference edge information 112 protrudes from the front and rear of the new edge information 111. Accordingly, the process proceeds to step S307 and the reference edge information recorded on the work buffer 106 of the management table 100 is divided into two pieces of edge information. Specifically, as the first divided edge information, edge information which has the same value of the start point as the value of the start point of the reference edge information and has the same value of the end point as the value of the start point of the new edge information is generated. As the second divided edge information, edge information which has the same value of the start point as the value of the end point of the new edge information and has the same value of the end point as the value of the end point of the reference edge information is generated. Thereafter, the value recorded in the work size field 102 is increased by the data size of the two divided pieces of edge information and is decreased by the data size of the reference edge information (step S308), and the value recorded in the number-of-edges field 103 is increased by 1 (step S309). Thus, since the overlap of the new edge information 111 and the reference edge information 112 is cancelled, the "edge overlapping process" ends.

When the start point of the reference edge information is previous to the start point of the new edge information (N in step S301) and the end point of the reference edge information is subsequent to the end point of the new edge information (N in step S310) as the results of the comparison of the foregoing steps S301, S302, and S310, the new edge information 111 overlaps with a part of the rear side of the reference edge information 112. Accordingly, the process proceeds to step S311 and the value of the end point of the reference edge information recorded on the work buffer 106 of the management table 100 is overwritten to the value of the start point of the new edge information. Thus, since the part of the rear side of the reference edge information 112 with which the new edge information 111 overlaps is deleted and the overlap of the new edge information 111 and the reference edge information 112 is thus cancelled, the "edge overlapping process" ends.

Next, the commanding process performed in step S116 of FIG. 10 will be described.

Figure 15:
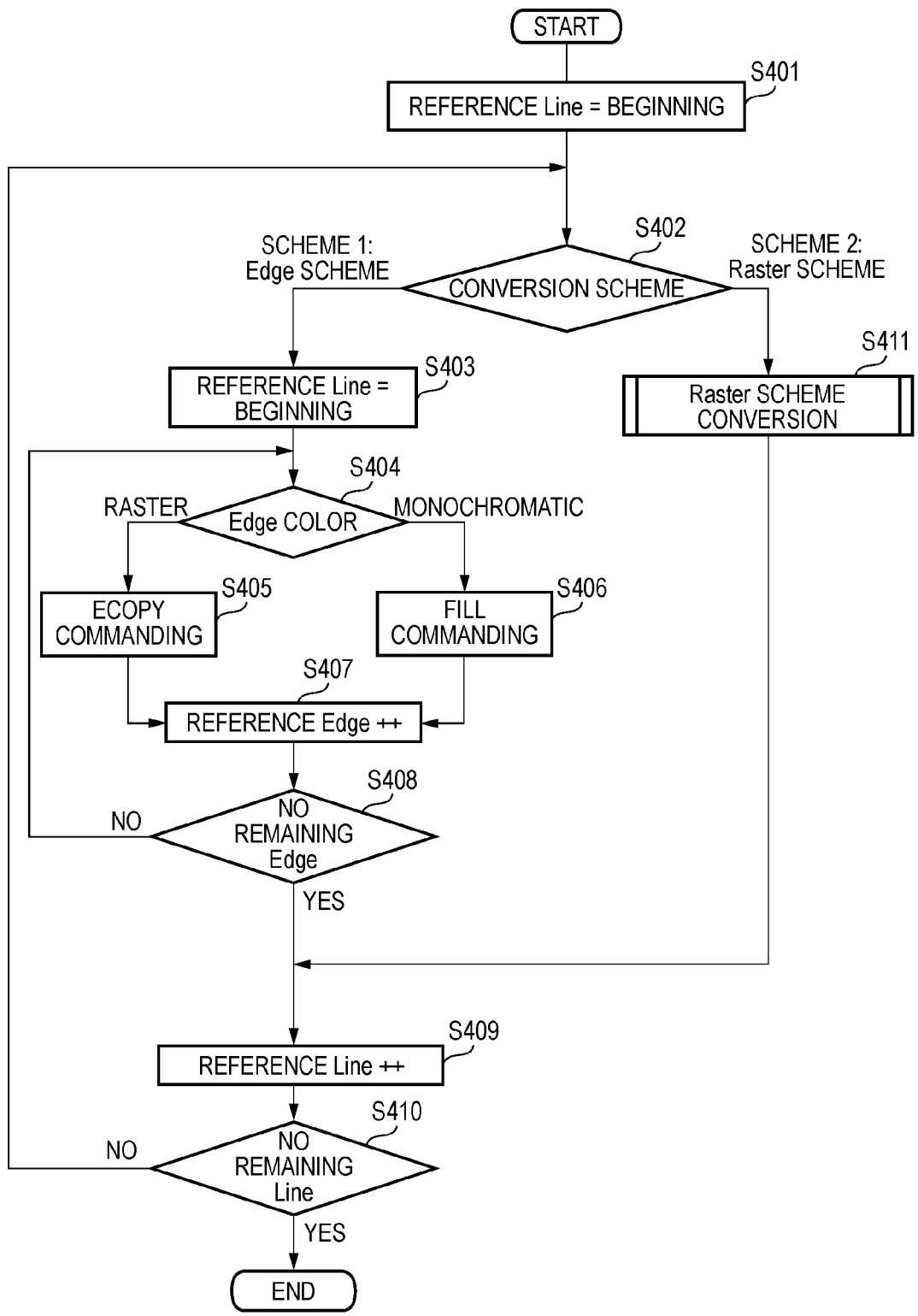
FIG. 15 is a flowchart illustrating an overall procedure of a commanding process.

FIG. 15 is a flowchart illustrating an overall procedure of the commanding process.

When the commanding process starts, the output line referred to as the processing target (hereinafter, the output line is referred to a "reference line") is first set as the beginning output line of the image (step S401). Then, the scheme recorded in the scheme field 101 of the management table 100 is confirmed as the conversion scheme of the reference line (step S402).

When the conversion scheme of the reference line is the edge scheme (left of step S402), the edge information located at the beginning of the reference line among the pieces of existing edge information serves as the reference edge information (step S403). Then, the format of the drawing color in the reference edge information is confirmed (step S404). When the drawing color in the reference edge information is the raster color (left of step S404), the reference edge information is converted into the ECOPY command (step S405). When the drawing color is monochromatic (right of step S404), the reference edge information is converted into the FILL command (step S406).

When the reference edge information is converted into the command in this way, the reference edge information is changed to the subsequent edge information in the row on the reference line (step S407). When there is "the subsequent edge information in the row" (N in step S408), the process returns to the foregoing step S404 and the above-described processes are repeated.

Conversely, when there is no "the subsequent edge information in the row" above described, the commanding on all of the subsequent pieces of edge information in the row on the reference line ends, and thus the reference line is changed to the subsequently located output line on the image (step S409). When there is "the subsequently located output line" (N in step S410), the process returns to the foregoing step S402. When there is no "subsequently located output line," the commanding process ends.

When it is confirmed in the above-described step S402 that the conversion scheme of the reference line is the raster scheme (right of step S402), a "raster scheme conversion process" to be described below is performed. Thus, the reference line is converted to the command line (step S411) and the reference line is subsequently changed to the subsequently located output line on the image (step S409). When there is "the subsequently located output line" (N in step S410), the process returns to the foregoing step S402. When there is no "subsequently located output line," the commanding process ends.

Next, the "raster scheme conversion process" performed in the foregoing step S411 will be described.

Figure 16:
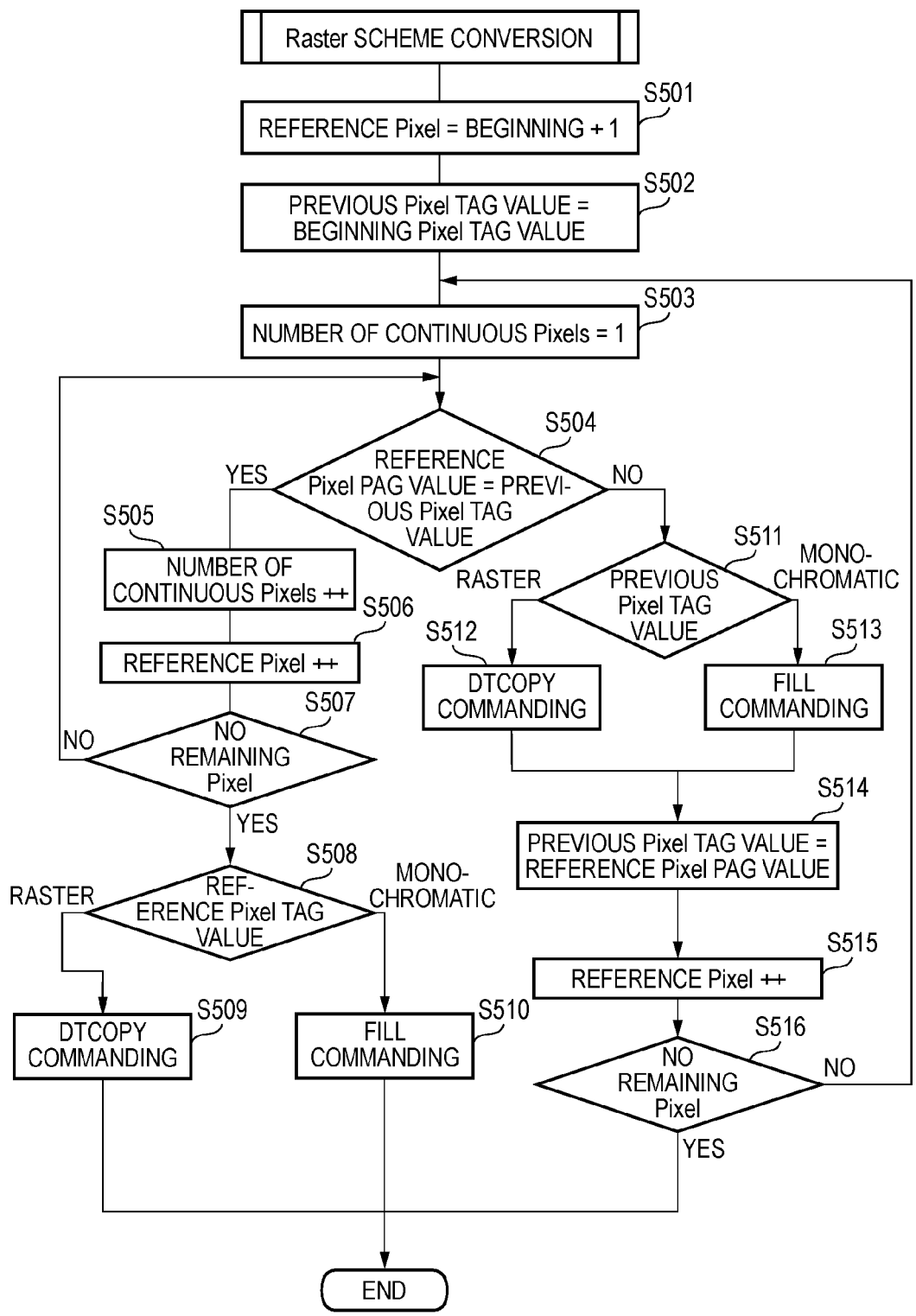
FIG. 16 is a flowchart illustrating a "raster scheme conversion process".

FIG. 16 is a flowchart illustrating the "raster scheme conversion process".

When the "raster scheme conversion process" starts, the subsequently located pixel of the leading pixel of the reference line is first set as a reference pixel (step S501). A tag value of the leading pixel is set as a tag value of a previous pixel located before the reference pixel on the reference line (step S502). Further, a value of "1" is substituted as the number of continuous pixels collected in one command (step S503). Thereafter, the tag value of the reference pixel is compared to the tag value of the previous pixel (step S504). When the tag values are identical (Y in step S504), the number of continuous pixels is increased by 1 (step S505) and the reference pixel is changed to the subsequently located pixel on the reference line (step S506). When there is no "subsequently located pixel" (Y in step S507), the reference pixel reaches the final of the reference line, and therefore the tag value of the reference pixel is confirmed (step S508). When the tag value indicates the raster color, the preceding continuous pixels are collectively converted into one DTCOPY command (step S509). When the tag value indicates the monochromatic color, the preceding continuous pixels are collectively converted into one FILL command (step S510) and the "raster scheme conversion process" ends.

Conversely, when there is the "subsequently located pixel" in the above-described step S507 (N in step S507), the process returns to step S504 to compare the tag values.

When there is a difference between the tag values in the comparison (N in step S504), the tag values of the previous pixels are subsequently confirmed (step S511). When the tag value indicates the raster color, the preceding continuous pixels are collectively converted into one DTCOPY command (step S512). When the tag value indicates the monochromatic color, the preceding continuous pixels are collectively converted into one FILL command (step S513).

Thereafter, the tag value of the reference pixel is set as the tag value of the previous pixel (step S514) and the reference pixel is changed to the subsequently located pixel on the reference line (step S515). When there is the "subsequently located pixel" (N in step S516), the process returns to step S503 and the above-described processes are repeated.

Conversely, when there is no "subsequently located pixel" (Y in step S516), the reference pixel reaches the final of the reference line, and thus the "raster scheme conversion process" ends.

Through the above-described processes, the second intermediate data is generated from the first intermediate data in accordance with the scheme advantageous to the generation.

In the foregoing description, the instance in which an exemplary embodiment of the drawing data generation apparatus according to the invention is incorporated in the print system has been described. The drawing data generation apparatus according to the invention may be incorporated in another output system such as a printing system.

In the foregoing description, the server 30 has been described as an exemplary embodiment of the drawing data generation apparatus according to the invention. The drawing data generation apparatus according to the invention may be incorporated in, for instance, a large-sized printer.

In the foregoing description, the BEF section 42 that selects the conversion scheme for each output line has been described as an instance of the second intermediate data generation section according to the invention. The second intermediate data generation section according to the invention may select the conversion scheme for each block, each page, or each job, for instance.

In the foregoing description, the BEP section 42 that selects the conversion scheme during the generation of the second intermediate data has been described as an instance of the second intermediate data generation section according to the invention. However, the second intermediate data generation section according to the invention may select the conversion scheme before the generation of the second intermediate data through data analysis of the first intermediate data, for instance.

In the foregoing description, the BEP section 42 that selects the conversion scheme according to the number of edges accumulated as the processing targets has been described as an instance of the second intermediate data generation section that selects the conversion scheme according to the number of drawing components according to the invention. However, the second intermediate data generation section according to the invention may select the conversion scheme according to the number of objects before the edging or may select the conversion scheme according to the number of edges in which an overlap occurs among the edges.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A drawing data generation apparatus comprising:
    a computer configured to function as:
    a first intermediate data generation section that generates, from formation image data in which a formation image formed on a recording material is indicated as a cluster of the drawing components allowed to mutually overlap, first intermediate data in which the formation image is indicated by a cluster of component data indicating a color and a range of a drawing component section;
    a second intermediate data generation section that generates, from the first intermediate data, second intermediate data indicating drawing content of each line-shaped region in a row of drawing commands which are drawn with no mutual overlap in the plurality of line-shaped regions divided in a line shape from the formation image and indicate colors and lengths; and
    a drawing data generation section that generates, from the second intermediate data, drawing data indicating drawing content of each line-shaped region in a row of pixel data indicating drawing colors in a plurality of pixels divided in a dot shape from the line-shaped region,
    wherein the second intermediate data generation section selects one of a first scheme of converting the formation image data into a cluster of the drawing components with no mutual overlap by arranging the overlap of the plurality of drawing components and generating the second intermediate data from the cluster of the drawing components and a second scheme of expressing and integrating the plurality of drawing components as a cluster of the pixels and generating the second intermediate data from the cluster of the pixels, based on the current first intermediate data or data which is generated in association with a process on the first intermediate data and depends on the first intermediate data,
    wherein the second intermediate data generation section selects one of the first and second schemes for each of the line-shaped regions based on both of the number of drawing components and a data amount necessary for the process of generating the second intermediate data and selects the second scheme irrespective of the data amount when the number of drawing components exceeds a predetermined degree.

2. The drawing data generation apparatus according to claim 1, wherein the second intermediate data generation section selects the second scheme when a data amount necessary for the process of generating the second intermediate data exceeds a predetermined degree.

3. The drawing data generation apparatus according to claim 1, wherein the second intermediate data generation section selects the first scheme in an initial setting when the second intermediate data generation section starts generating the second intermediate data, and then selects the second scheme when the second scheme is advantageous in association with the generation of the second intermediate data.

* * * * *